March 10, 1964    H. G. MUENCHINGER    3,124,188
LOCKING SCREW WITH DISPLACED THREAD PORTION
Filed Feb. 9, 1953    2 Sheets-Sheet 1
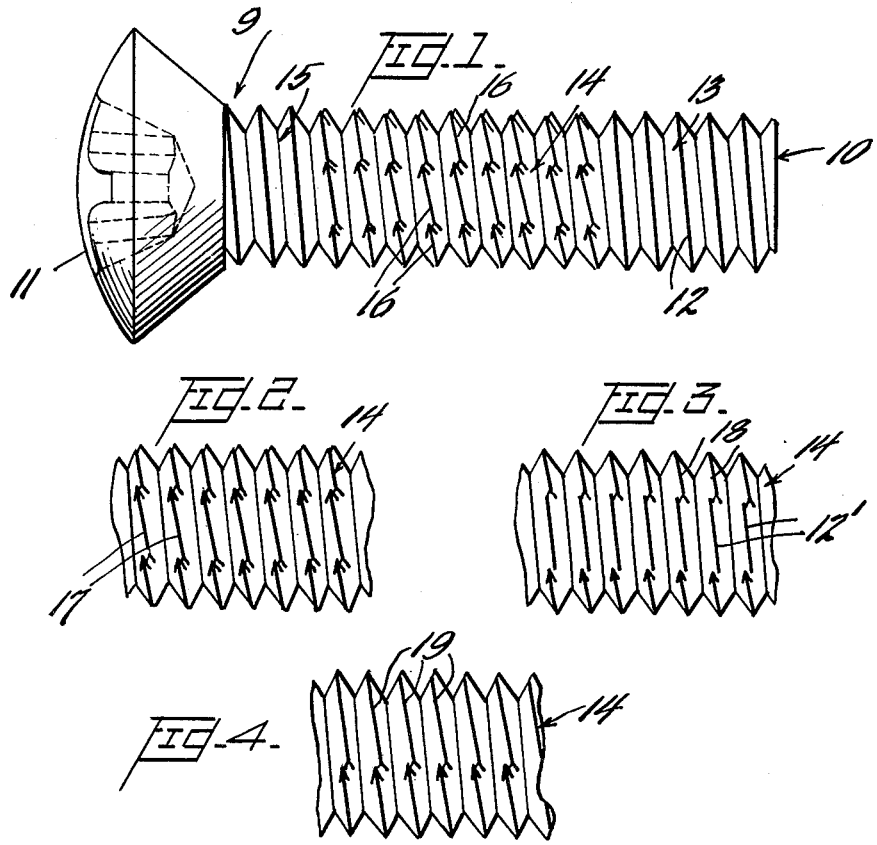
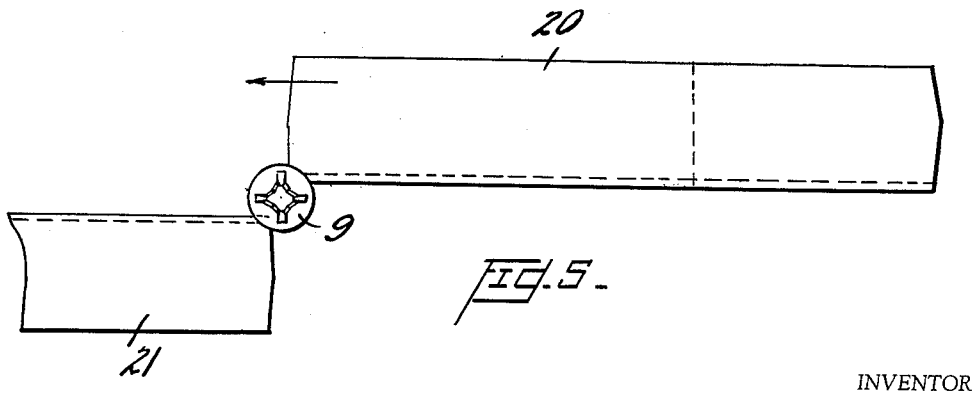
INVENTOR
Herman G. Muenchinger
BY
Watson, Cole, Grindle & Watson
ATTORNEYS March 10, 1964  H. G. MUENCHINGER  3,124,188
LOCKING SCREW WITH DISPLACED THREAD PORTION
Filed Feb. 9, 1953  2 Sheets-Sheet 2
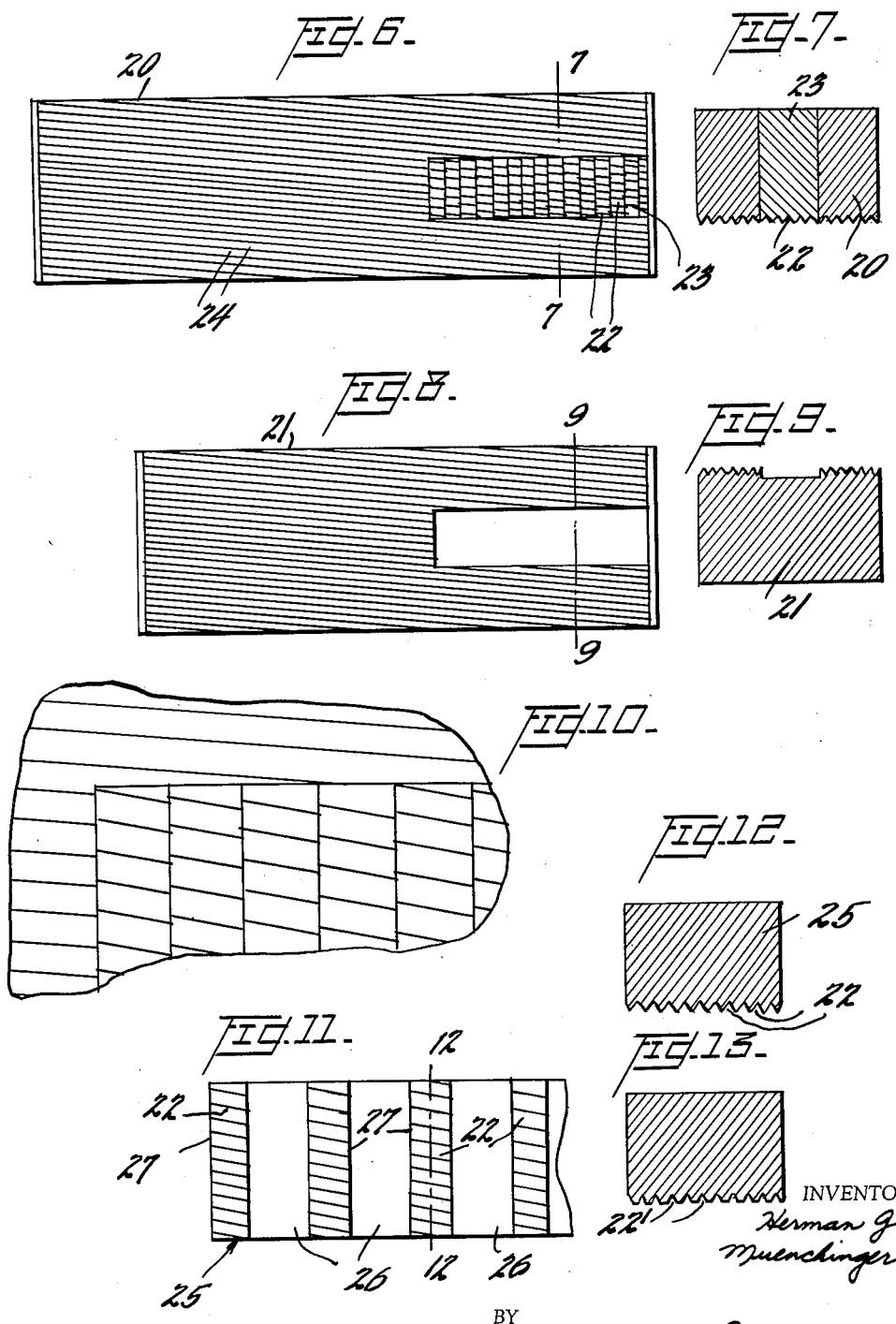

United States Patent Office 3,124,188
Patented Mar. 10, 1964

3,124,188
LOCKING SCREW WITH DISPLACED
THREAD PORTION
Herman G. Muenchinger, Chaplin, Conn., assignor, by
mesne assignments, to Phillips Screw Company, Natick,
Mass., a corporation of Delaware
Filed Feb. 9, 1953, Ser. No. 335,879
8 Claims. (Cl. 151—22)

This invention relates to fastening devices and apparatus for making same, and especially to a locking screw thread, novel thread rolling dies employed in the manufacture thereof, and a method of manufacturing said dies. More particularly, the screw or similar fastening device according to the invention includes a threaded shank, a portion of said shank being provided with a conventional helical thread and another portion of said shank being provided with an interrupted helical thread of the same slope, the interruptions consisting of thread segments, varying in length from a small fraction of a turn to a complete turn of the thread, which segments individually consist of portions of a helix of greater slope than that of the aforesaid conventional helical thread. The segments which are of greater slope than the conventional thread helix of the remainder of the screw shank may thus be said to be in disalignment with the general helix of the screw thread, but since like points of successive segments lie on a helix having the same slope as the general helix of the thread, it may be said that the "functional helix" of the disaligned segments or portions is of the same slope as that of the general thread helix.

A thread of the character described will have a ratchet-like effect in that the same may be tightened in a tapped hole without the exertion of substantially more torque than necessary for tightening a conventional machine screw, for example, but when a torque is applied in the opposite sense, tending to remove the screw, the ends of the disaligned portions or segments will tend to bite into the adjacent flank of the female thread and resist turning of the screw in the loosening direction.

Accordingly, it is the general object of the present invention to provide a fastening device comprising a shank provided with a helical thread, said thread being interrupted throughout a portion of the length of the shank by the provision, in each turn of the thread, of a thread portion which is in disalignment with the general helix of the thread, like points of all said disaligned portions lying in a helix which is of the same slope as said general helix.

Attempts have heretofore been made to provide a locking screw having characteristics somewhat similar to those described above, including thread segments which are in disalignment with the general helix of the screw thread. An example of such attempts is found in United States Patent No. 2,414,870, which describes a threaded article which, after threading, is subjected to transverse compression between dies or the like which do not completely embrace the threaded shank, a small gap being provided between the opposed dies. Such compression results in a fastening device having a shank which is oval in cross-section, those portions of the thread which are not received in the opposed compression dies being, by reason of the aforesaid distortion of the shank, somewhat displaced from the general helix of the thread. Such a fastener is difficult of insertion in a tapped hole, however, because of the excessive force necessitated by reason of the non-circular cross-section of the screw shank. By contrast, it is an object of the present invention to provide a locking screw of the character described in which the shank of the finished screw is of circular cross-section or, in other words, in which the crests of all parts of the thread of the screw lie in an imaginary surface of revolution rather than in an ellipsoidal or other distorted surface.

Another object is the provision of a fastening device having a locking thread of the character described in which the disaligned thread portions are interspaced by thread portions lying in the general helix of the thread.

Another object is the provision of a device of the character described in which the disaligned thread portions are arranged in unbroken succession throughout a portion of the threaded shank.

Another object is a device of the character described in which each of the disaligned thread portions comprises a complete turn of thread or, in other words, extends for a complete revolution around the shank.

Another object is the provision of a device of the character described in which each turn of thread, in the shank portion which includes said disaligned thread portions, consists of a plurality of said disaligned thread portions.

The disaligned portions, i.e., the portions of higher slope than the general helix of the thread, may be displaced symmetrically about their midpoints, or, alternatively, may be displaced about their end points. Accordingly, it is an object of the invention to provide a device of the character described in which the longitudinal midpoint of each said disaligned thread portion is a point on said general helix, and another object is the provision of such a device in which one end of each said disaligned thread portion lies in said general helix.

Another object of the invention is the provision of novel thread rolling dies for rolling onto the shank of a screw or the like, a thread of the character described. Such dies consist, as is usual, of a stationary die and a movable die which moves translationally while remaining parallel to the stationary die. In accordance with the present invention, one of the dies, preferably the stationary one, is provided with a relieved or unthreaded portion at and near that end which is last in contact with the screw being threaded, and the moving die is provided with an insert, adapted to lie opposite the said relieved portion of the stationary die during the final portion of the threading or rolling movement, which insert is provided with a series of groups of short groove segments of higher slope than the conventional threading grooves on the remainder of the die, for rolling the aforesaid disaligned portion of thread on the screw shank. Here again, the grooves of successive groups must have the same "functional slope" as the conventional threading grooves of the dies.

A still further object is the provision of a method of fabricating inserts or die portions of the character described above, by milling the segmental threading grooves on spaced lands or raised portions of a workpiece, then removing the intervening unthreaded portions of the workpiece and bringing together the threaded lands or raised portions to comprise the successive groups of grooves of which the die insert is comprised.

Other and further objects, features and advantages will be apparent from the description which follows, read in connection with the accompanying drawings in which FIGURE 1 is an elevational view of an oval head machine screw provided with a locking thread according to the present invention;

FIGURES 2, 3 and 4 are fragmentary elevational views illustrating modifications of the locking portion of the screw shank illustrated in FIGURE 1;

FIGURE 5 is a plan view showing the unthreaded screw and rolling dies in the position occupied at the commencement of the rolling movement;

FIGURE 6 is an elevational view of the moving thread rolling die;

FIGURE 7 is a section on line 7—7 of FIGURE 6;

FIGURE 8 is an elevational view of the stationary die, rotated 180° in the plane of the paper;

FIGURE 9 is a section on line 9—9 of FIGURE 8;

FIGURE 10 is an enlarged view of a portion of FIGURE 6;

FIGURE 11 illustrates a step in the production of the insert portion of the die of FIGURES 6 and 10;

FIGURE 12 is a section on line 12—12 of FIGURE 11; and

FIGURE 13 is an alternative embodiment of the characteristic illustrated in FIGURE 12.

While the locking thread feature is presently illustrated and described as applied to an oval head machine screw of the "Phillips type," the idea is not confined to this particular product but is applicable to bolts, studs, cap screws, tapping screws, wood screws, and virtually all threaded fasteners in which a locking feature may be of advantage, and regardless of the nature of the tool-receiving recess, slot, or surface with which the fastener may be provided.

Referring now to FIGURE 1, it will be seen that the fastening device there illustrated comprises an oval head machine screw 9 consisting generally of a cylindrical shank portion 10 and a head 11. The shank 10 is provided, in the present instance, with a V-type thread extending throughout the length of the shank, but it will be understood that the thread may be terminated at any desired distance from the head, for particular applications. For purposes of the present description, the shank may be said to be divided into three portions 13, 14 and 15, the thread 12 of the end portions 13 and 15 being of conventional helical form while in the intermediate shank portion 14 the thread is of a somewhat different character, consisting of a series of relatively short segments 16. Each segment 16 constitutes a portion of a helix of higher slope than that of the thread 12, while the "functional helix" of the thread provided on the shank portion 14 and consisting of the thread segments 16, remains the same as that of the thread 12. That is, like points on successive segments 16 lie on a helix having the same slope as that of the thread 12. Accordingly, the leading end of each segment 16 lies above (to the left in FIG. 1) the trailing end of the preceding segment 16, the terms "leading" and "trailing" having reference to rotation in the counterclockwise or loosening direction of rotation. Since the principal stress exerted upon the thread, when the screw is tightened, is exerted upon the upper flank of the thread, it will be apparent that the screw may be tightened with a minimum of additional resistance caused by the disaligned segments 16, whereas, when torque is applied in the opposite sense, to remove the screw, the upper or leading end of each segment 16 will tend to bite into the abutting flange of the female thread with which it is associated, thus resisting removal of the screw.

Case hardening or other heat treatment of a screw provided with a thread of the character described, is advantageous in that it will impart resilience to the segments 16, so that such segments will not be permanently deformed as the screw is tightened, but will remain operative to exert their aforesaid resistance to loosening of the screw.

In the device illustrated in FIGURE 1, it will be seen that each disaligned segment 16 has, in effect, been rotated counterclockwise about its midpoint, i.e., the midpoints of all segments lie on the same helix as that of the conventional thread 12. In FIGURE 2, the central portion 14 of the screw shank is provided with a locking thread comprising an uninterrupted succession of disaligned segments 17, as in FIGURE 1, but in this instance the segments have been thrown into disalignment by rotating them about their lower or rearward ends, which thus lie on the same helix as the conventional thread 12.

In FIGURE 3, the central portion 14 of the shank is provided with a locking thread comprising disaligned segments 18 interspaced with portions 12′ which lie on the same helix as that of conventional thread 12.

In FIGURE 4 the central shank portion 14 is provided with a locking thread in which each disaligned segment 19 consists in a complete turn of thread.

FIGURE 5 illustrates somewhat diagrammatically the technique of thread rolling, wherein the unthreaded screw 9 is positioned with its shank between the "beginning" ends of the moving die 20 and a stationary die 21. In the rolling operation the die 20 is moved to the left, causing the screw 9 to roll, also to the left, between the two dies and, due to the compression exerted upon the dies, causing the metal of the screw shank to be squeezed into the grooves of the respective dies to form a thread upon the shank. The nature of the thread so formed is, of course, dependent upon the nature of the threading grooves with which the respective dies are provided.

Threading dies of the type here in question are customarily provided with their threading grooves by means of milling operations, the slope or inclination of the grooves, and hence the threads to be formed thereby, being governed by the "milling angle" employed during the milling operation. In the present case it will be seen that the slope of the groove segments 22 comprising the insert portion 23 of the movable die is considerably greater than that of the grooves 24 of the main body of the die. However, while the groove segments 22 are of a uniform slope, they are in disalignment just as in the case of the locking thread described in connection with FIGURE 1. A novel and convenient method of making such an insert is indicated in FIGURE 11, which illustrates an intermediate product of the method.

The method of making an insert such as the insert 23 of FIGURE 6 comprises the steps of preparing, as by assembling a group of laminations, a rectangular block of steel 25 of the required dimensions, having alternate valleys 26 and lands 27, and milling segmental threading grooves 22 in the several lands in the same milling operation. All of the threading grooves are thus of the same slope. The intervening ungrooved portions or valleys are then removed, as by dropping out the corresponding laminations, and the grooved lands are assembled in close engagement to form a laminated insert in which the grooves of each group are offset from the grooves of the adjacent groups. The width of the individual lands, of course, determines the length of the groove segments and corresponding thread segments, while the transverse dimension of the slab 25 determines the width of the insert 23 and hence the length of the locking portion of the screw shank. The width and spacing of the lands are so related to the milling angle that the functional slope of the finished insert will correspond to the slope of the grooves on the main body of the die with which the insert is to be used.

For the modification of FIGURE 13, the threading grooves 22′ are made shallower, i.e., the crests between threading grooves are truncated, so that when a screw shank is rolled as described above, only the crest of the conventional thread first rolled on portion 14 will be displaced by contact with the insert 23. This operation places less strain on the equipment and requires less energy.

In lieu of providing a separate part or insert 23 in the die 20, the groups of disaligned groove segments may be formed on the die by a cold hobbing operation or in any other effective and suitable manner.

Having thus described my invention, what I claim as new and desire to secure by Letters Patent is:

1. A fastening device comprising a threaded shank, said thread being generally helical and of V-type thread form having a wider root portion and a narrower crest, the thread crest being interrupted throughout a plurality of turns by the provision in each turn of the thread of a thread crest portion which is otherwise normal and of uniform section throughout its length but is in disalignment with said helix, like points of all said disaligned portions lying in a helix which is of the same pitch as the general helix of said thread, the crests of all parts of said thread lying in an imaginary right circular cylinder.

2. A fastening device according to claim 1, successive disaligned thread portions corresponding to uniformly spaced, separated portions of a common helix of different helix angle than said general helix.

3. A fastening device according to claim 1, said disaligned thread portions being helically interspaced by thread portions lying in said general helix.

4. A fastening device according to claim 1, said disaligned thread portions each comprising a complete turn of thread.

5. A fastening device according to claim 1, said disaligned thread portions being arranged in unbroken succession.

6. A fastening device according to claim 1, said disaligned thread portions being arranged in unbroken succession, each turn of thread comprising a plurality of said disaligned portions.

7. A fastening device according to claim 1, the longitudinal midpoint of each said disaligned portion being in said general helix.

8. A fastening device according to claim 1, one end of each said disaligned portion being in said general helix.

References Cited in the file of this patent

UNITED STATES PATENTS

| | | |
|---|---|---|
| 756,269 | McMahon | Apr. 5, 1904 |
| 1,070,247 | Haines | Aug. 12, 1913 |
| 1,245,362 | Lynch | Nov. 6, 1917 |
| 1,521,322 | Reed | Dec. 30, 1924 |
| 1,963,845 | Hosking | June 19, 1934 |
| 2,177,004 | Purtell | Oct. 24, 1939 |
| 2,208,811 | Kiehne | July 23, 1940 |
| 2,284,659 | Hosking | June 2, 1942 |
| 2,321,375 | Erdman | June 8, 1943 |
| 2,414,870 | Harding | Jan. 28, 1947 |